March 2, 1954

R. BURGHOLZ 2,671,174

METHOD OF MEASURING FLOWING MEDIA

Filed Feb. 20, 1950

RUDOLF BURGHOLZ
INVENTOR.

Robert H. Jacor.

AGENT

Patented Mar. 2, 1954

2,671,174

UNITED STATES PATENT OFFICE 2,671,174

METHOD OF MEASURING FLOWING MEDIA

Rudolf Burgholz, Herten, Germany

Application February 20, 1950, Serial No. 145,202

2 Claims. (Cl. 250—43.5)

The invention relates to a method of metering flow through pipe systems by means of X- or gamma-rays.

For metering the volume of flowing matter such as gases, compressed air, vapor, and liquids in pipe systems, there is available besides float-type volume and flow rate meters a variety of devices based on the increase in flowing rate occurring due to choking means such as diaphragms, jet orifices, or Venturi tubes. However, in addition to the flow-rate controlled active dynamic pressure even the static pressure of the pipe system acts on the indicator system and its associated tube sections. Most indicators are useful only with low system pressures not exceeding some 430 lb. s. i. At medium pressures ranging between some 580 lb. s. i. and 1,000 lb. s. i., the operational safety of the metering equipment is already heavily influenced by what leakage conditions may be present at the connecting and linking joints, and most of all by the performance of the pressure-resistant lead-through section which takes care of transmitting the movements of the metering device to the indicator outside the system. At pressures in excess of 1,150 lbs. s. i., as are encountered in systems operating under super-high pressure, lead-through mechanisms are troublesome in both design and operation, the more so when temperatures exceeding 212° F. are involved.

The method suggested herein eliminates these difficulties. It operates with no physical branch-out or tie to the pipe system whatsoever, requires no pressure-resistant lead-through sections, nor any leverage system for transferring the indication to the outside. It is equally useful at low, medium, and high pressures, and in particular suited for metering the flow of substances which are poisonous or prone to explode.

The invention resides in the use of the radiation of an X-ray tube or radio-active preparation for indicating the position or rotary speed of a movable body within the tubing system which in turn is under direct control by the quantity under measurement.

The invention also comprises methods and devices for metering or measuring dimensions of flowing matter such as volume and flowing rate by means of X- or gamma-rays.

The invention will best be understood if reference be had to the accompanying drawing showing its preferred embodiments and in which.

Flow rates are converted to frequencies, by means of X-ray or gamma-radiation, a metering wheel, and a counter tube, in a manner that the individual flow rates are strictly correlated to specific frequencies by means of the rotary speed of the metering wheel.

Figure 1:
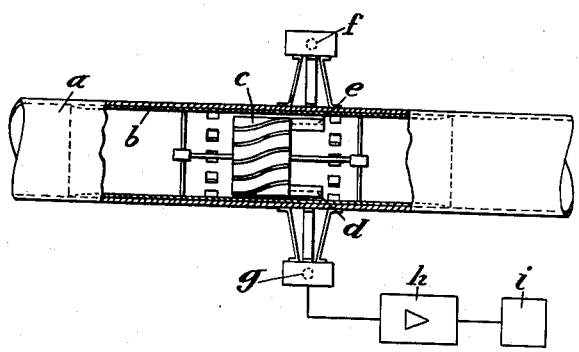
Figure 1 shows in a longitudinal section of a tube the new metering means inserted therein for indicating the rotary speed of metering body.

Figure 1 shows an embodiment utilizing an impeller wheel as a metering device. This principle can equally be incorporated in reeling-disc type counters, piston-type counters, etc. In metering flowing air or gases, the setup will have to undergo some logical transformation by the application of anemometer-type metering vanes.

Figure 2:
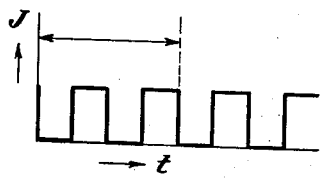
Figure 2 is the ideal impulse pattern.

In Figure 1, $a$ designates a pipe duct in which the cylinder section $b$ with its metering wheel $c$ has been inserted. The liquid in passing rotates the helical blades of the metering wheel. At one end of the metering wheel two opposite small vanes project beyond the wheel. These vanes $d$ and $e$ match the shape of the cylindrical envelope of the metering wheel, while they extend through some 12% to 25% of the circular perimeter. These vanes which are made of ray-absorbing material, when in the position shown between the radioactive preparation $f$ and the counter-tube $g$, cut the bunch of rays which is narrowed down to a low cross sectional area by diaphragm apertures. For each revolution of the metering wheel they thus cut the rays twice so that the counter-tube receives two radiation impulses per revolution. With vanes 25% of the cylinder perimeter in length, the on and off periods of the ray are equal when the wheel is spinning at uniform speed. For rectangular vanes, the ideal impulse pattern appears as shown in Figure 2.

Thus each rotary speed reflects in the counter-tube as so many impulses per time unit. The signal undergoes electronic amplification at $h$ whereupon it is fed to the metering device $i$. At low frequency rates, a loudspeaker may serve as the most straight-forward of indicators. The audible pops are counted through a certain time interval checked by a stop-watch, unless one prefers recourse to an electromechanical counter. Preferable is the use of a direct-reading frequency-meter on a capacitor-charge basis with a calibration in terms of the quantity under measurement. A recorder may be connected in parallel with this metering device. The metering accuracy of this method is rather high, and independent on what fluctuations may occur in radiation intensity, amplifier gain, etc., as it is only the time rate of radiation impulses that counts in determining the rotary speed and thus the flow or volume time rate.

Figure 3:
Figure 3 shows a detail of Figure 1 in a modified form.
Figure 4:
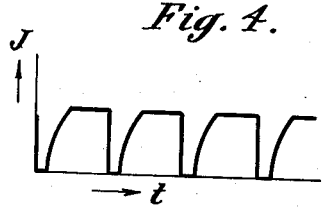
Figure 4 and Figure 5 show modified impulse pattern according to Figure 1.
Figure 5:
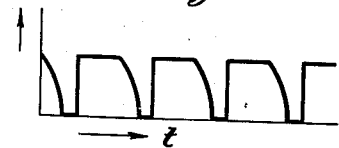

In order to indicate flow reversal, on which feature special emphasis is placed in some applications, the method illustrated requires the following modifications: both vanes, unlike what is shown in Figure 1, will now be shaped at one side to taper down to a point, as is indicated in Figure 3 on one vane. This modifies the pulse pattern of Figure 2 in a way that with the rotary sense of the metering wheel as presumed in Figure 2 the radiation intensity J drops down to zero instantly as the rays are being cut, but the maximum of outgoing radiation is now reached gradually as determined by the shape of the vane, rather than in a sudden jump. The resultant lack of pulse pattern symmetry permits discrimination between right- or left-hand rotation of the wheel, by the criterion whether the pulses start with a sudden jump (right-hand rotation), or gradually (left-hand rotation). To ascertain this, the frequency indicator in Figure 1 is replaced by an oscilloscope or a loop-type oscillograph. Right-left-hand rotation will then reflect in pulse trains on the luminous screen as shown in Figures 4 and 5. If some standard frequency signal is traced out simultaneously, the rotary speed and thus the volume rate can be read. An oscilloscope offers optimum observation facilities as it indicates without delay all of the details of the characteristic being checked, such as the starting phenomena, fluctuations, etc. Moreover, these screen patterns are easily photographed which is an important factor in investigation and checkup.

If right-hand and left-hand rotations are to be told apart even in devices where the preparation is riding on the vanes or the wheel shaft proper, either the second vane must be provided with a cutout of suitable shape, or a patterned diaphragm has to be placed over the counter-window.

The versatility of both methods presumably needs no further illustration by examples, but reference may be made to their particular usefulness in serial tests such as ascertaining whether the heating surfaces of boiler-tubes are uniformly provided with feed water. Such investigation is important for finding all the facts about water circulation, which existing metering methods have been unable to adequately disclose. Prior to heating, calibrated metering wheels are inserted through the feed-water drum in three tubes of the heating section in a way that all of the metering vanes are in one plane between feed water drum and boiler shell. The radioactive preparation, or the X-ray tube and the counter-tube with its associated amplifier, frequency indicator, and cathode-ray oscilloscope have been fixed in a frame structure in a way that they can be moved normal to the vanes riding along a bar. When preparation and counting tube are above the axis of a tube, the assembly can be clamped down in this position by a detent mechanism, while the rotary speed is read off, and the associated screen pattern is filmed. In this manner it is possible to obtain by high-speed recording of instantaneous patterns of each tube of the heating chamber under a variety of operational conditions, an overall picture of the water current pattern throughout the heating system.

Having now described the invention, what I claim as new and desire to secure by Letters Patent of the United States is:

1. Device for metering volume of matter flowing through a pipe line, comprising a cylindrical section of light-resistant material inserted in said line, an impeller wheel disposed in said cylindrical section adapted to rotate about an axis coinciding with the axis of said pipe line and having helical blades rotated by the flowing liquid, an X-ray emitting body, means adapted to shield the X-rays and to direct them to transverse said pipe line, means adapted to interrupt the X-rays including vanes provided upon and projecting beyond said impeller wheel and being tapered to a point at one side, and means serving as a frequency indicator showing the impulse pattern, whereby the lack of symmetry of said impulses permits discrimination between right hand and left hand rotation of said impeller wheel, thereby indicating the direction of flow.

2. Device for metering volume of matter flowing through a pipe line of light resistant material, comprising an impeller wheel to indicate the measure of the flowing medium disposed in said pipe line and adapted to be rotated by the flowing matter at a rotary speed corresponding to the volume to be metered and having helical blades extending in the path of the flowing matter and two vanes projecting beyond said impeller wheel and tapered to a point at one side, an X-ray emitting source associated with said vanes in a manner to permit X-ray emission only in one direction, and indicator means responsive to X-rays and disposed externally of said pipe line and adapted to cooperate with said X-ray emitting source.

RUDOLF BURGHOLZ.

References Cited in the file of this patent

UNITED STATES PATENTS

| Number | Name | Date |
|---|---|---|
| 1,957,681 | Thompson | May 8, 1934 |
| 2,301,251 | Capen | Nov. 10, 1942 |
| 2,316,239 | Hare | Apr. 13, 1943 |
| 2,316,255 | Knobel et al. | Apr. 13, 1943 |
| 2,326,169 | Piquerez | Aug. 10, 1943 |
| 2,461,351 | Silverman | Feb. 8, 1949 |